(12) United States Patent
Brewster et al.

(10) Patent No.: US 10,950,992 B1
(45) Date of Patent: Mar. 16, 2021

(54) ELECTRICAL FIXTURE MOUNTING SYSTEM

(71) Applicants: Peter Brewster, Forked River, NJ (US); Melanie Brewster, Forked River, NJ (US)

(72) Inventors: Peter Brewster, Forked River, NJ (US); Melanie Brewster, Forked River, NJ (US)

( * ) Notice: Subject to any disclaimer, the term of this patent is extended or adjusted under 35 U.S.C. 154(b) by 0 days.

(21) Appl. No.: 16/555,239

(22) Filed: Aug. 29, 2019

(51) Int. Cl.
*H01R 13/73* (2006.01)
*H01R 13/24* (2006.01)
*H01R 13/631* (2006.01)

(52) U.S. Cl.
CPC ............. *H01R 13/73* (2013.01); *H01R 13/24* (2013.01); *H01R 13/631* (2013.01)

(58) Field of Classification Search
CPC .... H01R 13/207; H01R 13/213; H01R 13/73; H01R 13/24; H01R 13/631
USPC .................. 439/350, 21, 333, 338, 489, 289
See application file for complete search history.

(56) References Cited

U.S. PATENT DOCUMENTS

| | | | | |
|---|---|---|---|---|
| 3,994,552 A | * | 11/1976 | Selvin ................... | E21B 17/028 439/278 |
| 4,778,404 A | * | 10/1988 | Pass ................... | H01R 13/2428 439/246 |
| 5,431,580 A | * | 7/1995 | Tabata ................... | B60L 53/16 439/289 |
| 6,293,510 B1 | | 9/2001 | Bradford et al. | |
| 6,386,897 B1 | * | 5/2002 | Muller ................ | H01R 13/625 439/263 |
| 6,409,531 B1 | * | 6/2002 | Millard .................. | H01R 13/22 439/289 |
| 7,128,592 B2 | * | 10/2006 | Li ...................... | H01R 13/2435 439/289 |
| 7,344,398 B2 | | 3/2008 | Sibout | |

(Continued)

FOREIGN PATENT DOCUMENTS

EP 2662933 A1 11/2013

*Primary Examiner* — Abdullah A Riyami
*Assistant Examiner* — Marcus E Harcum
(74) *Attorney, Agent, or Firm* — Thomas J. Germinario (57) ABSTRACT

A base module having a cylindrical female socket mates with a cylindrical cartridge plug connected to the electrical fixture. The base socket contains at least three circular or annular electrical contact strips, which are electrically connected to at least hot, neutral and ground wires of the building's circuitry. The male cartridge plug, which is configured to be rotatably insertable into the female base socket, contains at least three spring-loaded pop-up electrical contacts, each of which engages one of the base contact strips and remains continuously so engaged through a full 360° rotation of the cartridge plug. The plug's pop-up contacts are electrically connected, through the plug casing, to at least the hot, neutral and ground terminals of the electrical fixture. Rotational adjustments of the fixture are accommodated by rotating the cartridge plug within the base socket. Two spring-loaded locking arms on the plug are configured to releasably engage the base socket so as to fix the rotational orientation of the fixture once it has been adjusted. The cartridge plug is mechanically connected to the fixture through a cartridge mount, which is configured to enable and secure translational adjustments in the position of the fixture.

3 Claims, 6 Drawing Sheets

(56) References Cited

U.S. PATENT DOCUMENTS

| | | | |
|---|---|---|---|
| 7,740,499 B1 * | 6/2010 | Willey | G02B 23/12 439/332 |
| 8,066,412 B2 | 11/2011 | Vann et al. | |
| 8,858,236 B2 * | 10/2014 | Richard | H01R 24/68 439/21 |
| 9,531,118 B2 * | 12/2016 | Byrne | H01R 13/6205 |
| 9,803,844 B2 | 10/2017 | Chad | |
| 10,511,123 B2 * | 12/2019 | Lin | H01R 13/6277 |
| 2002/0004325 A1 * | 1/2002 | Pereira | H01R 43/0263 439/83 |
| 2005/0085131 A1 | 4/2005 | Sutherland | |
| 2008/0057766 A1 * | 3/2008 | Yoshida | H01R 13/6315 439/325 |
| 2008/0214034 A1 * | 9/2008 | Byrne | H01R 31/02 439/215 |
| 2008/0318474 A1 * | 12/2008 | Crotinger | H01R 24/76 439/607.01 |
| 2009/0129101 A1 | 5/2009 | Bowden, Jr. et al. | |
| 2014/0235073 A1 * | 8/2014 | Scorzelli | H01R 13/629 439/13 |
| 2015/0340805 A1 * | 11/2015 | Jordan | H01R 13/6456 439/338 |
| 2015/0349477 A1 * | 12/2015 | Riedmaier | H01R 39/18 439/30 |
| 2016/0166061 A1 * | 6/2016 | Trachtenberg | H01R 35/04 361/809 |
| 2016/0215967 A1 | 7/2016 | Chad | |
| 2016/0370547 A1 * | 12/2016 | Logan, Jr. | G02B 6/4283 |
| 2017/0062999 A1 * | 3/2017 | Thiers | H04M 1/04 |
| 2018/0017243 A1 | 1/2018 | Palmer | |
| 2018/0209630 A1 | 7/2018 | Palmer | |
| 2020/0059038 A1 * | 2/2020 | Wimmer | H01R 12/716 |

* cited by examiner

ELECTRICAL FIXTURE MOUNTING SYSTEM

FIELD OF INVENTION

The present invention relates to the general field of electrical fixtures and more specifically to systems for installing and mounting such fixtures which do not require professional wiring.

BACKGROUND OF THE INVENTION

Among the deterrents to changing or adding electrical fixtures, such as lighting sconces and ceiling fans, in residential and commercial buildings are the difficulty and expense of installing the requisite wiring. Consumer installation of such fixtures is fraught with perils, including electrical shock and fire hazards. On the other hand, employment of professional electricians can be prohibitively expensive.

These difficulties could be minimized by a pre-wired universal electrical fixture mounting base with a twist-and-lock mechanism by which a variety of appliances could be energized without the need for hard-wiring. The present invention is designed to provide such a permanent electrical mounting system.

SUMMARY OF THE INVENTION

Since different electrical fixtures have varying sizes and configurations, a universal mounting system must be able to accommodate these differences by enabling positional adjustments, both in terms of rotation and translation. Such positional adjustability must be combined with stability of the mount under a variety of fixtures loads, which may be of the shearing (wall mounts) and/or tension (ceiling mounts) types.

The present invention addresses these requirements by providing a base module having a cylindrical female socket which mates with a cylindrical cartridge plug connected to the electrical fixture. The base socket contains at least three circular or annular electrical contact strips, which are electrically connected to at least hot, neutral and ground wires of the building's circuitry. The male cartridge plug, which is configured to be rotatably insertable into the female base socket, contains at least three spring-loaded pop-up electrical contacts, each of which engages one of the base contact strips and remains continuously so engaged through a full 360° rotation of the cartridge plug. The plug's pop-up contacts are electrically connected, through the plug casing, to at least the hot, neutral and ground terminals of the electrical fixture.

Rotational adjustments of the fixture are accommodated by rotating the cartridge plug within the base socket. Two spring-loaded locking arms on the plug are configured to releasably engage the base socket so as to fix the rotational orientation of the fixture once it has been adjusted. The cartridge plug is mechanically connected to the fixture through a cartridge mount, which is configured to enable and secure translational adjustments in the position of the fixture.

The foregoing summarizes the general design features of the present invention. In the following sections, specific embodiments of the present invention will be described in some detail. These specific embodiments are intended to demonstrate the feasibility of implementing the present invention in accordance with the general design features discussed above. Therefore, the detailed descriptions of these embodiments are offered for illustrative and exemplary purposes only, and they are not intended to limit the scope either of the foregoing summary description or of the claims which follow.

DETAILED DESCRIPTION OF THE PREFERRED EMBODIMENT

Figure 1A:
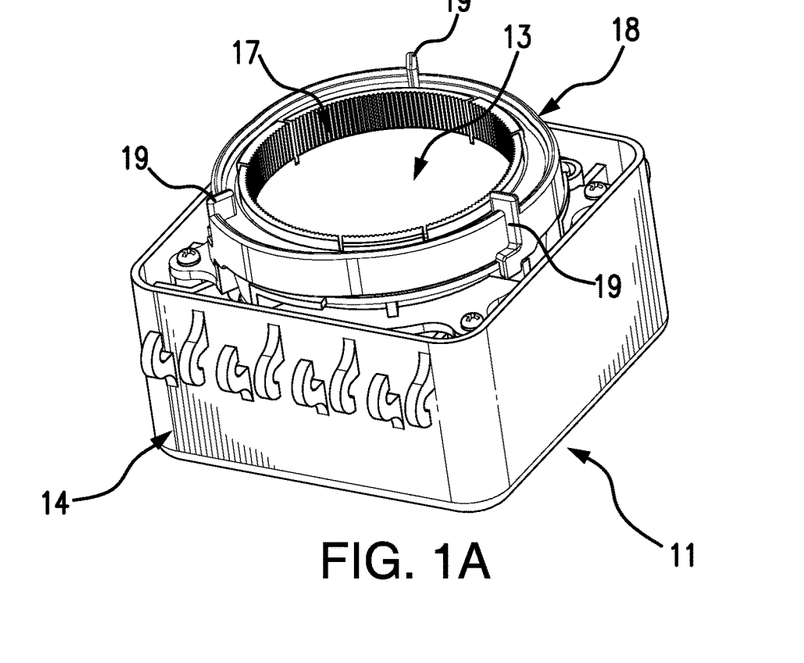
FIG. 1A is an upper isometric view of the base module of one embodiment of the present invention.
Figure 1B:
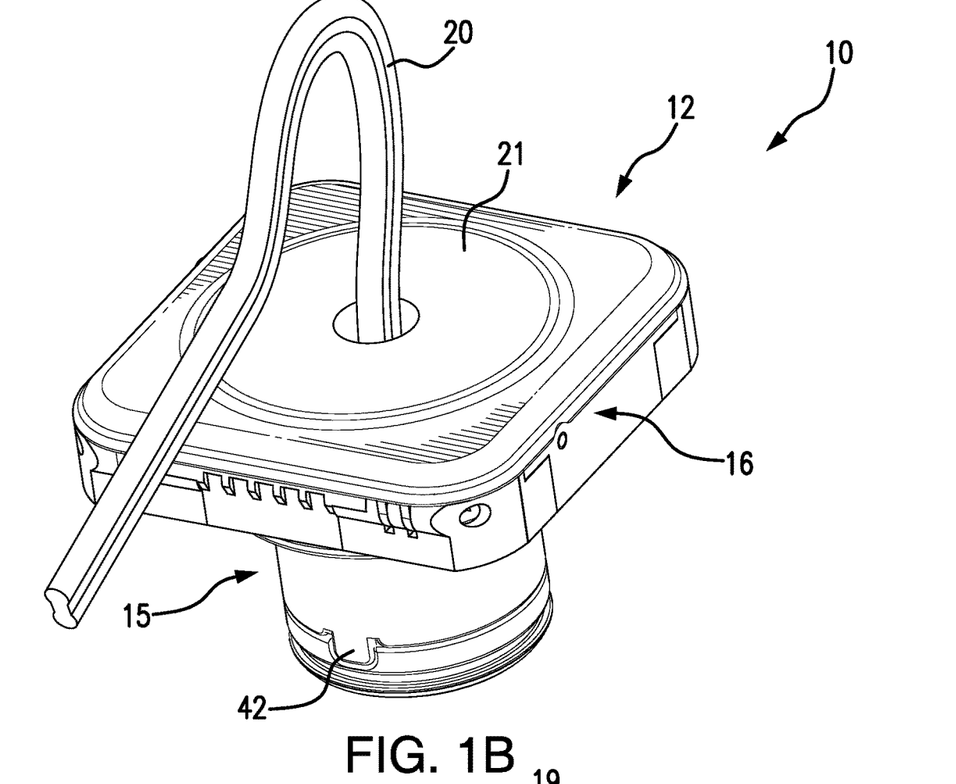
FIG. 1B is an upper isometric view of the cartridge module of one embodiment of the present invention.
Figure 3:
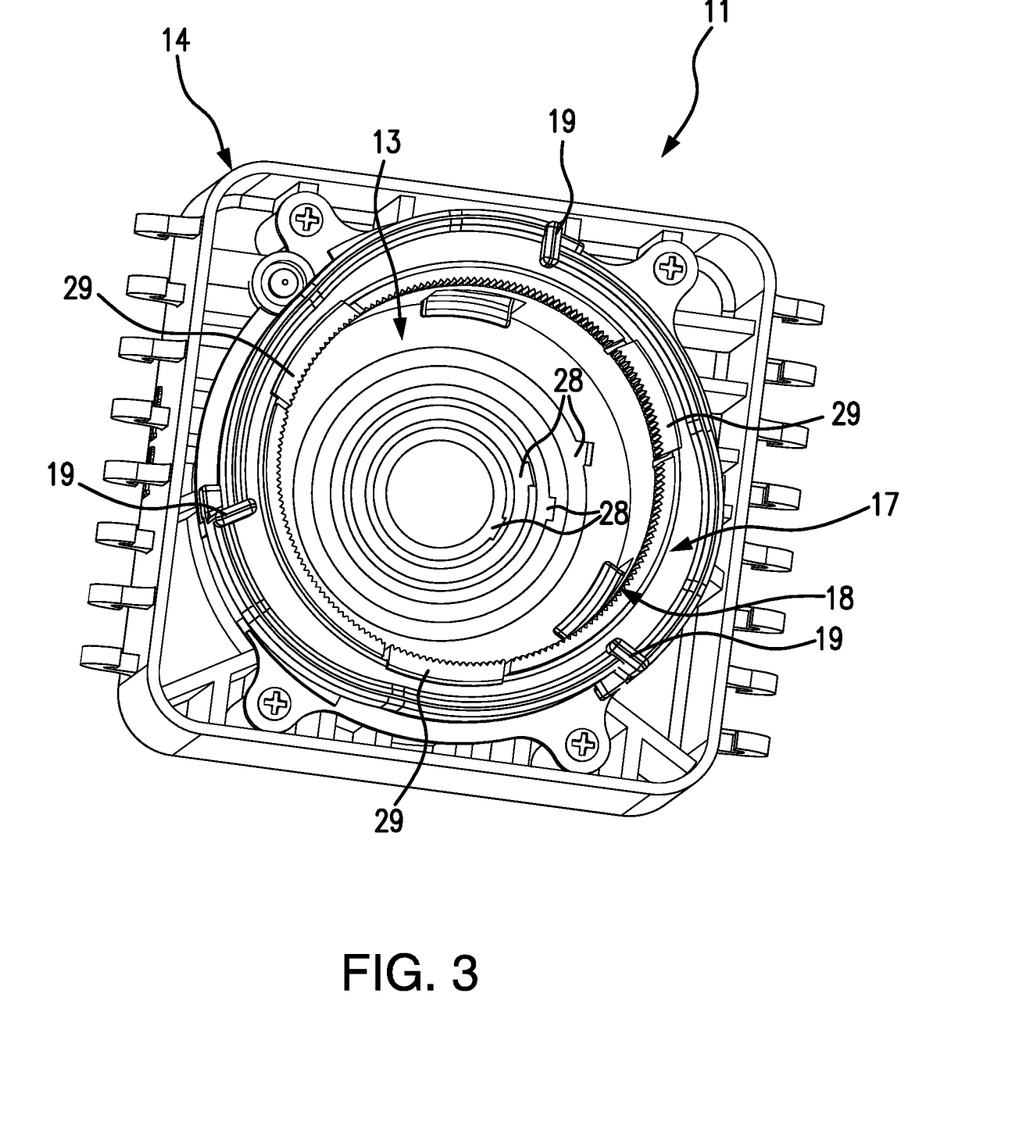
FIG. 3 is a plan perspective view of the base module of one embodiment of the present invention.

Referring to FIGS. 1A, 1B and 3, one exemplary embodiment of the present invention 10 comprises a base module 11 and a cartridge module 12. The electrical fixture to be mounted (not shown) either contains the cartridge module 12 or is mechanically attached to it. The base module 11 comprises a cylindrical base socket 13, the lower portion of which is enclosed on the sides and bottom by an open cubic base box 14. The cartridge module 12 comprises a cylindrical cartridge plug 15 downwardly extending from a cuboidal cartridge mount 16.

The male cartridge plug 15 is conjugately insertable into the female base socket 13, in which the cartridge plug 15 is releasably vertically retained by three spring-loaded flex arms 29, which are segments of an annular spring-loaded rotation ring 17. The rotation ring 17 is surrounded by a spring-loaded annular release ring 18 having three release flanges 19. When the release ring 18 is rotated, the release flanges 19 engage the spring-loading mechanism of the flex arms 29 so as to retract the flex arms 29, thereby allowing the cartridge plug 15 to be vertically lifted out of the base socket 13. After its rotation, the spring-loading of the release ring 18 returns it to its initial position, thereby allowing the cartridge plug 15 to be re-inserted into the base socket. The above-described mechanism constitutes an exemplary twist-and-lock-mechanism by which the cartridge plug 15 is removably insertable into base socket 13.

Figure 2A:
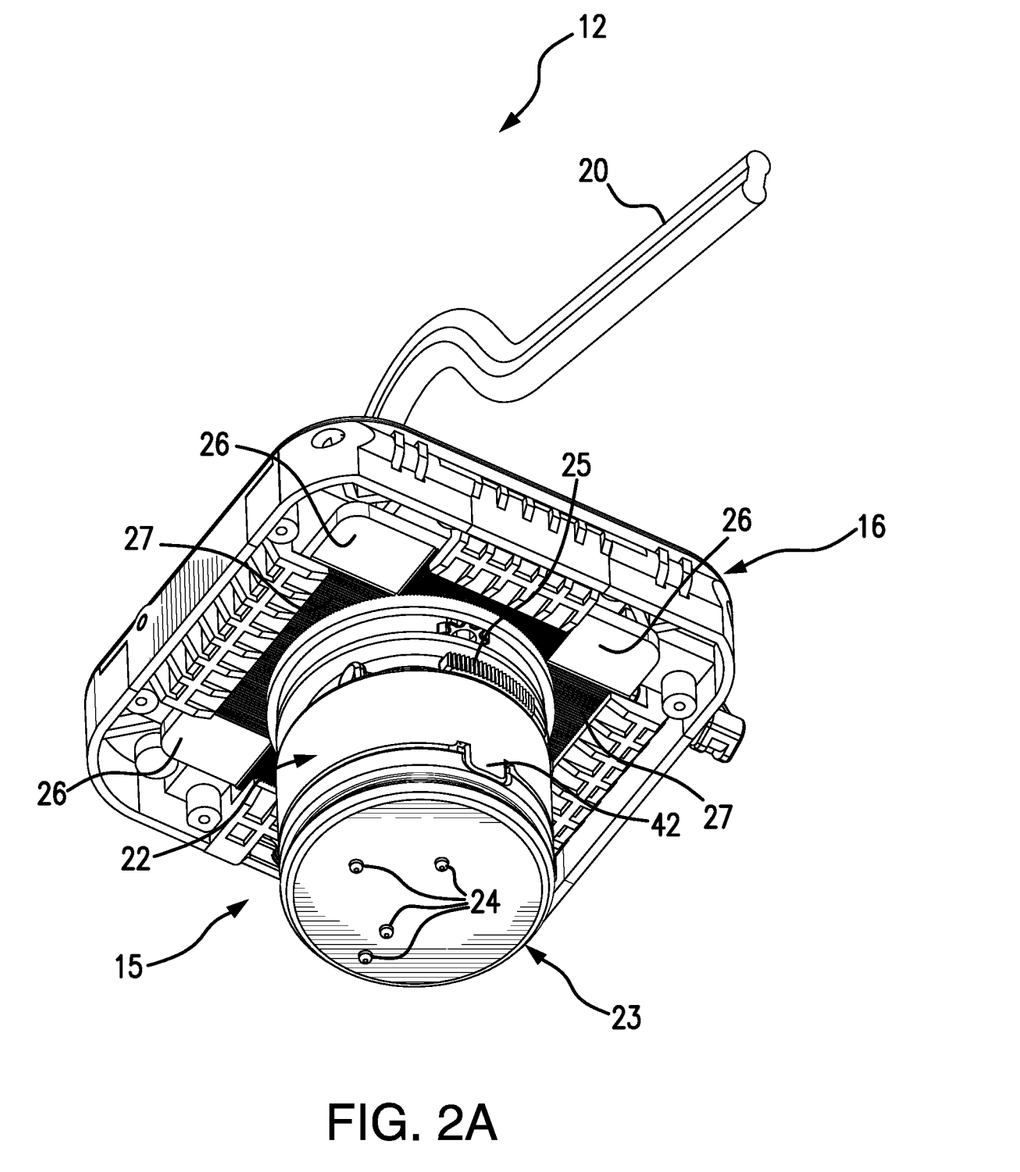
FIG. 2A is a lower isometric view of the cartridge module of one embodiment of the present invention.

Referring to FIG. 1B, a fixture cord 20 is electrically connected to the cartridge module 12 through an aperture in a face plate 21, which is hingeably connected at the top of the cartridge mount 16. Referring to FIG. 2A, the fixture cord 20 extends through the cartridge mount 16 into a plug casing 22 at the top of the cartridge plug 15, within which the constituent wires of the fixture cord 20 are electrically connected to spring-loaded pop-up contacts 24 embedded in the bottom face of a plug cap 23 forming the lower end of the cartridge plug 15. For access to the electrical connections of the fixture cord 20, the plug cap 23 is attached by conjugate threading to the plug casing 22, from which the plug cap 23 can be unscrewed. To prevent unscrewing of the plug cap 23 during rotational adjustment of the cartridge plug 15, a releasable spring-loaded plug detent 42 is provided.

In this exemplary embodiment, four pop-up contacts 24 are provided, corresponding to a fixture cord 20 containing hot, neutral, ground and signal wires. It should be understood, however, that the number of the pop-up contacts 24 can be adjusted to accommodate any wiring configuration of the fixture cord 20. The pop-up contacts 24 can be of the "pogo-pin" type.

Figure 2B:
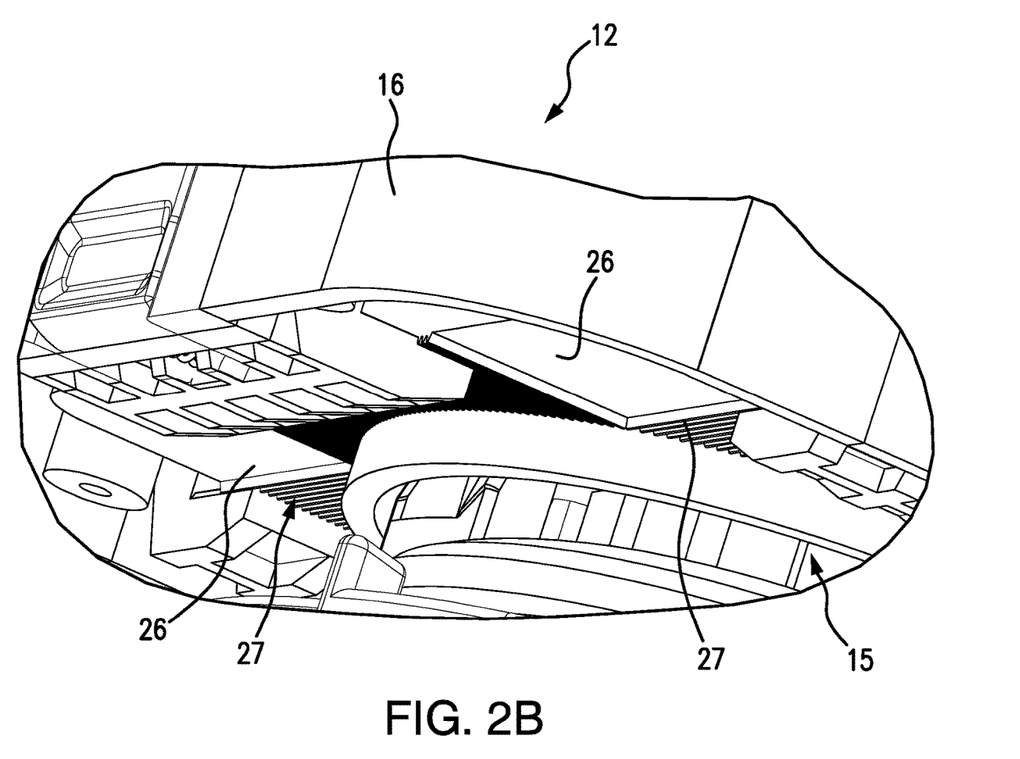
FIG. 2B is a detail perspective view of the translational adjustment mechanism of one embodiment of the present invention.

Referring to FIGS. 2A and 2B, adjustments to the translational position of the mounted electrical fixture are accomplished by making the cartridge mount 16 laterally movable in relation to the cartridge plug 15. In this exemplary embodiment, the translational adjustment mechanism comprises four spring-loaded translational adjustment pads 26, having ridges on their undersides which conjugately engage translational adjustment teeth 27 on the bottom face of the cartridge mount 16. Pushing the cartridge plug 15 upward against the cartridge mount 16 releases the engagement tension of the spring-loading of the translational adjustment pads 26, thereby allowing the cartridge mount 16 to be laterally repositioned in relation to the cartridge plug 15.

Figure 4:
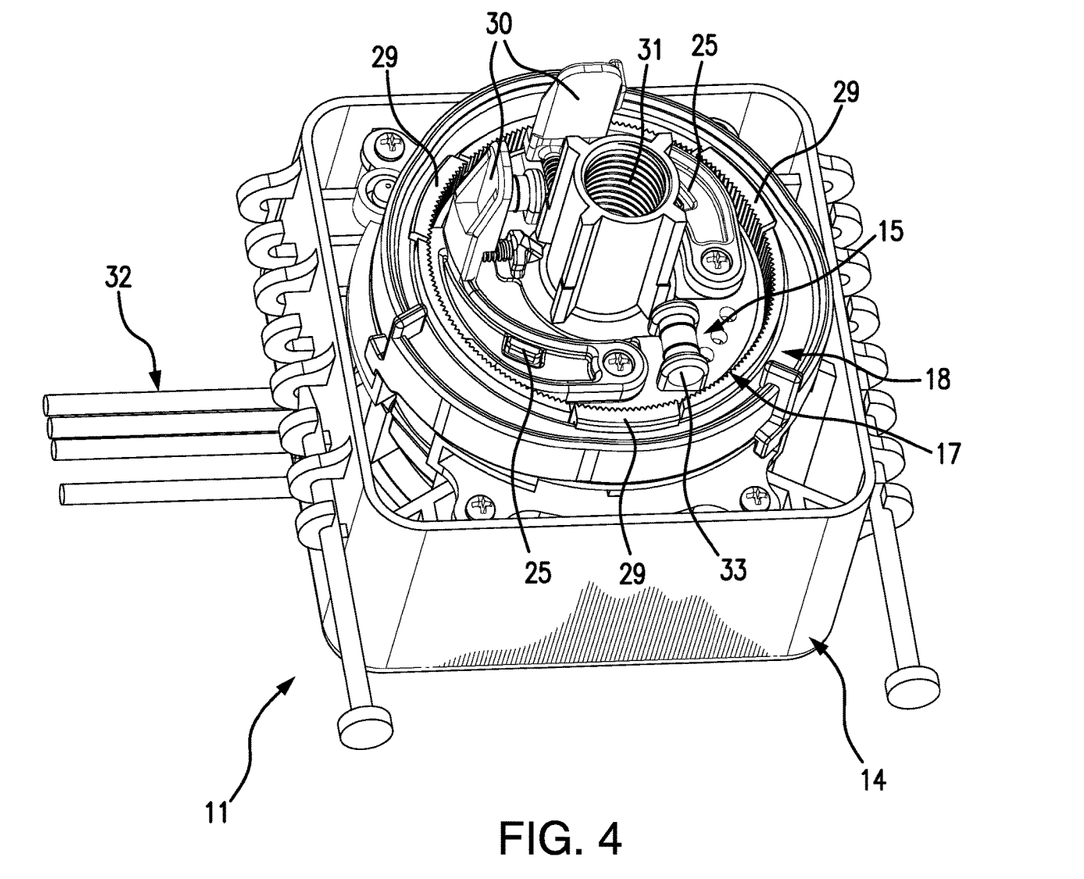
FIG. 4 is an upper perspective view of the base module with the cartridge plug inserted therein, according to one embodiment of the present invention.

Referring to FIGS. 3 and 4, the bottom of the base socket 13 contains four recessed concentric circular contact strips 28, which are configured to conjugately align with and engage the four pop-up contacts 24 on the bottom of the cartridge plug 15. The concentric circular configuration of the contact strips 28 allows them to remain engaged with the pop-up contacts 24 throughout a complete 360° rotation of the cartridge plug 15 within the base socket 13, thereby enabling a full rotational re-positioning of cartridge module 12 and its encompassing or attached electrical fixture. The engagement between the pop-up contacts 24 and the contact strips enables the transmission of electrical current to the fixture cord 20 from the building's power wires 32, which are electrically connected to the contact strips 28 through the base module 11. In this exemplary embodiment, four power wires (hot, neutral, ground, and signal) are provided, corresponding to the four contact strips 28, the four pop-up contacts 24, and the four wires in the fixture cord 20. The contact strips 28 are recessed in the bottom of the base socket 13 to prevent accidental human contact.

As best seen in FIG. 4, the rotation of the cartridge plug 15 within the base socket 13 is controlled by a rotational adjustment mechanism comprising two mirrored spring-loaded rotational locking arms 25 at the top of cartridge plug 15, which is shown here detached from the cartridge mount 16. The outer side of each of the rotational locking arms 25 have ridges which conjugately engage, under spring tension, teeth on the inner side of rotation ring 17. The spring tension of the rotational locking arms 25 is released by compressing rotational release levers 30 on the distal ends of the rotational locking arms 25, thereby enabling complete rotation of the cartridge plug 15 within the base socket 13 for the purpose of rotational adjustment of the mounted electrical fixture. Vertically extending from the top side of the cartridge plug 15 is a tubular cord socket 31, through which the fixture cord 20 enters the cartridge plug 15. Optionally, the top of the cartridge plug 15 can also contain one or more bubble levels 33 to ensure that the installation is level with respect to the mounting surface.

Figure 5:
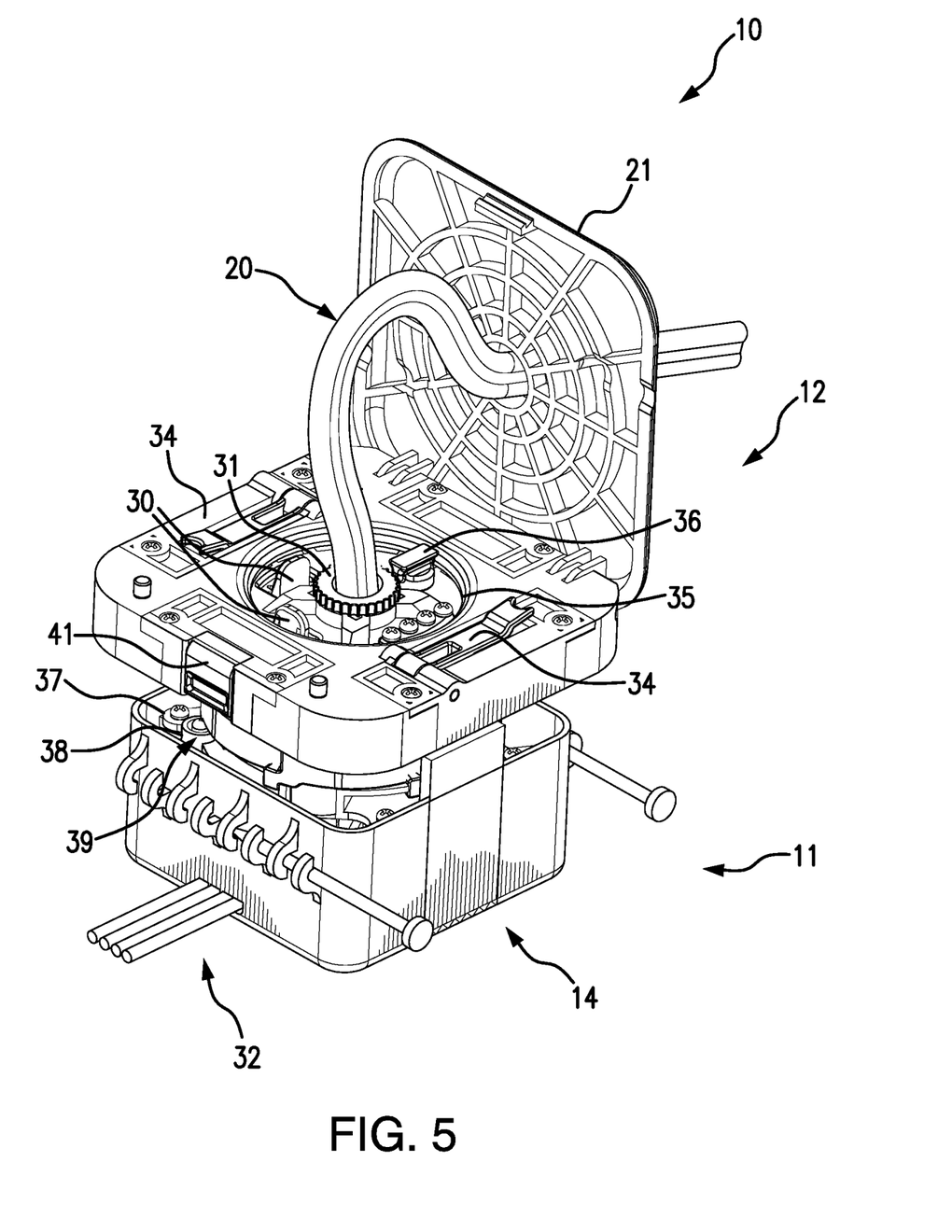
FIG. 5 is an upper isometric view of one embodiment of the present invention, with the face plate opened.

FIG. 5 depicts the exemplary embodiment of the present invention 10 fully assembled, but for the supported electrical fixture. Two translational cam levers 34 on the upper side of the cartridge mount 16 are used to lock down the translational adjustment mechanism on the under side of the cartridge mount 16. The aperture through which the top of the cartridge plug 15 passes through the cartridge module 12 contains a rotatable cartridge retainer ring 35, which is engaged under tension by the two spring-loaded rotational release levers 30. A cartridge release knob 36, when turned, rotates the cartridge retainer ring 35, thereby disengaging the rotational release levers 30 and allowing the cartridge mount 16 to be separated from the cartridge plug 15. In the base module 11, a green LED 37 and a red LED 38 are optionally provided to indicate if the wiring has been properly installed upon depressing a wiring check button 39. In this view, the face plate 21 is shown opened to better reveal the components of the cartridge module 12. When the face plate is closed, it is secured by a face plate closure latch 41.

Although the preferred embodiment of the present invention has been disclosed for illustrative purposes, those skilled in the art will appreciate that many additions, modifications and substitutions are possible, without departing from the scope and spirit of the present invention as defined by the accompanying claims.

What is claimed is:

1. A device for mounting an electrical fixture to a supporting structure in a building, the device comprising:
    a base module and a cartridge module;
    wherein the base module comprises a cylindrical base socket, having a closed socket side and an open socket side and having a socket bottom interior to the closed socket side, and an open cubic or cuboidal base box, which encloses the closed socket side;
    wherein the cartridge module comprises a cylindrical cartridge plug, which extends from a distal face of a cuboidal cartridge mount;
    wherein the electrical fixture either incorporates the cartridge module or is mechanically attached to the cartridge module;
    wherein the electrical fixture is electrically connected to at least three spring-loaded pop-up electrical contacts embedded in a distal face of the cartridge plug;
    wherein the cartridge plug is conjugately insertable into the base socket, in which the cartridge plug is releasably secured by a spring-loaded twist-and-lock mechanism;
    wherein the base socket contains at least three concentric annular electrically conductive contact strips, which are electrically connected through the base box to at least three power wires from the building, and wherein the contact strips are configured to engage the pop-up electrical contacts when the cartridge plug is inserted into the base socket, thereby completing an electrical circuit between the power wires and the electrical fixture;
    wherein the cartridge plug, upon being inserted into the base socket, is rotatable through 360 degrees within the base socket, and wherein rotation of the cartridge plug within the base socket is controlled by a rotational adjustment mechanism comprising two spring-loaded rotational locking arms, which conjugately engage a rotation ring around an inner perimeter of the base socket; and
    wherein all the contact strips are continuous, without openings or gaps, and are embedded in the socket bottom, and wherein the contact strips are configured to continuously engage the pop-up electrical contacts through a full 360-degree rotation of the cartridge plug within the base socket.

2. The device according to claim 1, wherein the cartridge mount is laterally movable in relation to the cartridge plug by means of a translational adjustment mechanism.

3. The device according to claim 2, wherein the rotational adjustment mechanism comprises multiple spring-loaded translational adjustment pads, which conjugately engage translational adjustment teeth in the distal face of the cartridge mount.

* * * * *